(12) United States Patent
Komaki et al.

(10) Patent No.: US 10,796,113 B2
(45) Date of Patent: Oct. 6, 2020

(54) READER DEVICE AND TABLE WITH READER DEVICE

(71) Applicant: Murata Manufacturing Co., Ltd., Nagaokakyo-shi, Kyoto-fu (JP)

(72) Inventors: Kunihiro Komaki, Nagaokakyo (JP); Noboru Kato, Nagaokakyo (JP); Tatsuya Ito, Nagaokakyo (JP); Shunji Mandai, Nagaokakyo (JP); Naoto Ikeda, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 16/394,422

(22) Filed: Apr. 25, 2019

(65) Prior Publication Data

US 2019/0251306 A1 Aug. 15, 2019

Related U.S. Application Data

(63) Continuation of application No. PCT/JP2017/039407, filed on Oct. 31, 2017.

(30) Foreign Application Priority Data

Nov. 14, 2016 (JP) .................................. 2016-221855

(51) Int. Cl.
 *G06K 7/08* (2006.01)
 *G06K 7/10* (2006.01)
 (Continued)

(52) U.S. Cl.
 CPC ........... *G06K 7/10297* (2013.01); *G06K 7/10* (2013.01); *H01Q 3/24* (2013.01); *H01Q 9/26* (2013.01);
 (Continued)

(58) Field of Classification Search
 CPC ...... G06K 7/0008; G06F 3/1454; G06F 3/147
 (Continued)

(56) References Cited

U.S. PATENT DOCUMENTS

2005/0134506 A1\* 6/2005 Egbert ............. G06K 19/07749
                                                343/700 MS
2006/0187135 A1\* 8/2006 Maniwa ................. H01Q 1/007
                                                343/795

(Continued)

FOREIGN PATENT DOCUMENTS

JP   2006237916 A   9/2006
JP   2009017449 A   1/2009
              (Continued)

OTHER PUBLICATIONS

International Search Report issued for PCT/JP2017/039407, dated Jan. 23, 2018.

(Continued)

*Primary Examiner* — Ahshik Kim
(74) *Attorney, Agent, or Firm* — Arent Fox LLP

(57) ABSTRACT

A reader device is provided having a wider readable area and a table with the reader device. The reader device includes an antenna element communicating with an RFID tag attached to an article, a reader module electrically connected to the antenna element and reading information of the RFID tag through the antenna element, and a case housing the antenna element and the reader module. Moreover, the antenna element includes a first dipole antenna having a first element axis extending in a first direction, and a second dipole antenna having a second element axis extending in a second direction crossing the first direction.

17 Claims, 13 Drawing Sheets

(51) Int. Cl.
*H04B 5/00* (2006.01)
*H01Q 9/26* (2006.01)
*H04B 5/02* (2006.01)
*H01Q 21/24* (2006.01)
*H01Q 3/24* (2006.01)

(52) U.S. Cl.
CPC ........... *H01Q 21/24* (2013.01); *H04B 5/0062* (2013.01); *H04B 5/02* (2013.01)

(58) Field of Classification Search
USPC ........................................................ 235/451
See application file for complete search history.

(56) References Cited

U.S. PATENT DOCUMENTS

| | | | | |
|---|---|---|---|---|
| 2007/0194929 | A1* | 8/2007 | Wagner | G06K 7/10346 340/572.7 |
| 2007/0290937 | A1 | 12/2007 | Maniwa | |
| 2007/0290940 | A1 | 12/2007 | Maniwa | |
| 2010/0079252 | A1 | 4/2010 | Tsujimoto | |
| 2010/0117919 | A1 | 5/2010 | Mizuno | |
| 2013/0043981 | A1* | 2/2013 | Wang | G06K 7/10356 340/10.1 |
| 2014/0375432 | A1* | 12/2014 | Forster | G06K 7/10178 340/10.1 |
| 2015/0261983 | A1* | 9/2015 | Ruotsalainen | H04B 5/0062 235/439 |
| 2019/0108373 | A1* | 4/2019 | Ito | H04W 4/80 |
| 2019/0140364 | A1* | 5/2019 | Mirmozafari | H01Q 5/48 |

FOREIGN PATENT DOCUMENTS

| | | |
|---|---|---|
| JP | 2009077246 A | 4/2009 |
| JP | 2010086111 A | 4/2010 |
| JP | 2010130302 A | 6/2010 |
| JP | 2011097650 A | 5/2011 |
| JP | 2014075755 A | 4/2014 |

OTHER PUBLICATIONS

Written Opinion of the International Searching Authority issued for PCT/JP2017/039407, dated Jan. 23, 2018.

* cited by examiner

READER DEVICE AND TABLE WITH READER DEVICE

CROSS REFERENCE TO RELATED APPLICATIONS

The present application is a continuation of PCT/JP2017/039407 filed Oct. 31, 2017, which claims priority to Japanese Patent Application No. 2016-221855, filed Nov. 14, 2016, the entire contents of each of which are incorporated herein by reference.

TECHNICAL FIELD

The present disclosure relates to a reader device for reading an RFID tag attached to an article such as a clothing article and a table with a reader device.

BACKGROUND

Conventionally, a patch antenna has been known as an antenna element used for this type of reader device (see, for example, Patent Document 1).
Patent Document 1: Japanese Unexamined Patent Application No. 2009-17449.
When articles such as clothing articles are displayed on the surface of a top plate of a table, for example, by attaching an antenna element to the table and reading information of an RFID tag attached to an article through the antenna element, inventory management or the like can be performed in real time. Further, by attaching the antenna element to the rear surface of the top plate of the table, it is possible to make the antenna element inconspicuous and prevent impairment of the image of the articles displayed on the surface of the top plate part of the table.

However, when the patch antenna is used as the antenna element, since the patch antenna mainly has directivity only in one direction, information of only the RFID tag positioned substantially directly above the patch antenna can be read. For this reason, for example, in order to make the entire surface of the top plate of the table be a readable area of the reader device, it is necessary to arrange a plurality of patch antennas dispersedly on the entire rear surface of the top plate part of the table. In this case, it is necessary to increase the size of the reader device or to provide a plurality of reader devices. Also, patch antennas generally have characteristics such as being large in size, complex in structure, and high in cost. For this reason, a compact reader device having a wider readable area is needed.

SUMMARY OF THE INVENTION

Accordingly, it is an object of the present disclosure to provide a reader device having a wider readable area and a table with a reader device.

Thus, in an exemplary aspect, a reader device according to the present disclosure is provided that includes an antenna element communicating with an RFID tag attached to an article; a reader module electrically connected to the antenna element and reading information of the RFID tag through the antenna element; and a case housing the antenna element and the reader module. Moreover, the antenna element includes a first dipole antenna having a first element axis extending in a first direction; and a second dipole antenna having a second element axis extending in a second direction crossing the first direction.

In addition, a table with a reader device according to an exemplary aspect of the present disclosure is provided that includes a top plate part on which an article to which an RFID tag is attached is placed on a front surface side; and a reader device attached to a rear surface side of the top plate part and reading information of the RFID tag. Moreover, the reader device includes an antenna element communicating with the RFID tag; a reader module electrically connected to the antenna element and reading information of the RFID tag through the antenna element; and a case housing the antenna element and the reader module, wherein the antenna element includes: a first dipole antenna having a first element axis extending in a first direction that is along a main surface of the top plate part; and a second dipole antenna having a second element axis extending in a second direction that is along the main surface of the top plate part and crosses the first direction.

According to the present disclosure, a reader device is provided having a wider readable area and a table with a reader device.

DETAILED DESCRIPTION

Figure 1:
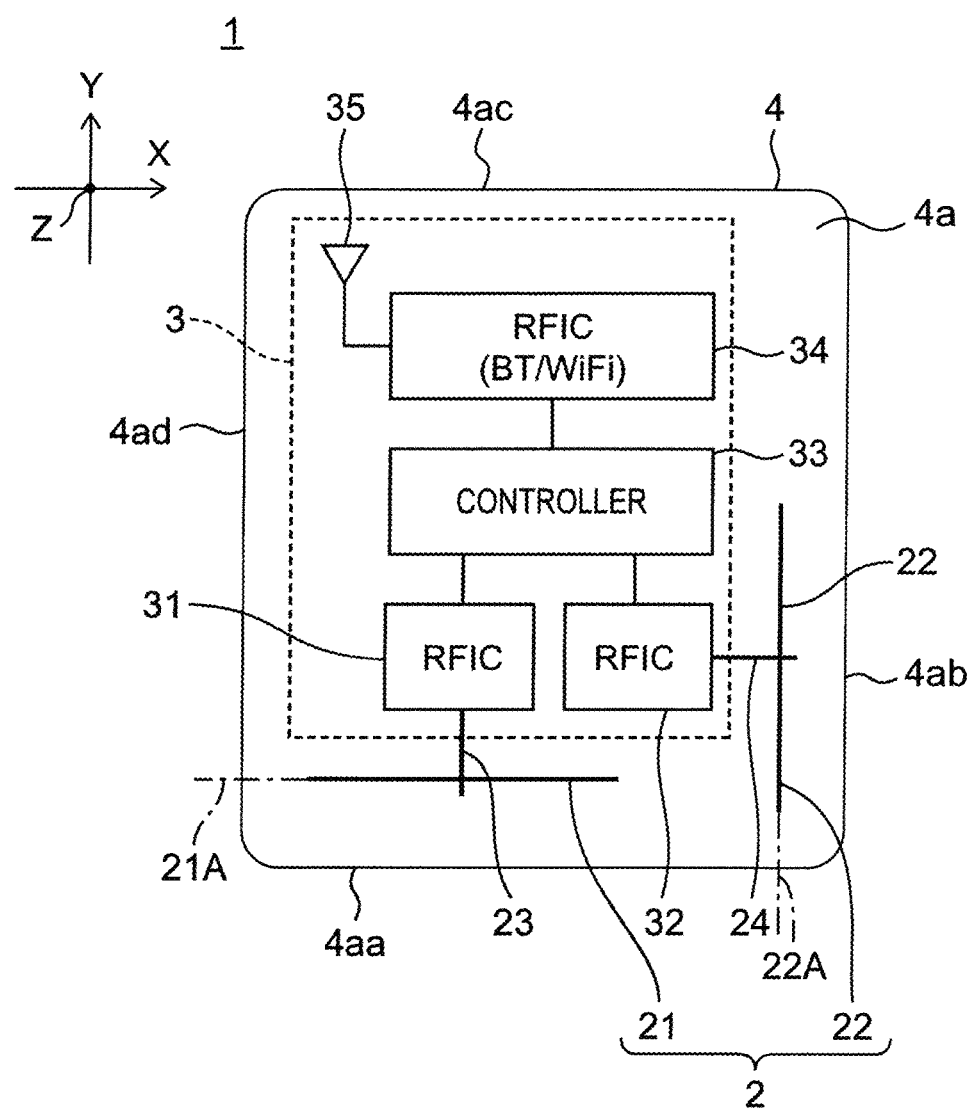
FIG. 1 is a block diagram illustrating a schematic configuration of a reader device according to a first embodiment of the present disclosure.

A reader device is disclosed according to one exemplary aspect of the present disclosure that includes an antenna element communicating with an RFID tag attached to an article; a reader module electrically connected to the antenna element and reading information of the RFID tag through the antenna element; and a case housing the antenna element and the reader module. In this aspect, the antenna element includes a first dipole antenna having a first element axis extending in a first direction; and a second dipole antenna having a second element axis extending in a second direction crossing the first direction.

In general, a dipole antenna has a donut-shaped radiation pattern with an extending direction of two elements being an element axis, has large gain in a direction orthogonal or substantially orthogonal to the extending direction, and has a property that it is easy to read an RFID tag positioned in this direction. On the other hand, the dipole antenna has a property that it is difficult to read an RFID tag positioned in the extending direction of the two elements.

In the above configuration, since the first dipole antenna and the second dipole antenna are provided as the antenna element, the antenna element has a donut-shaped radiation pattern with each of the first element axis and the second element axis being the center, and thus the readable area can be improved (e.g., made wider).

Further, in the above configuration, the first dipole antenna and the second dipole antenna are arranged so that the first element axis crosses the second element axis. Thus, for example, even when the RFID tag is positioned in the extending direction of the two elements of the first dipole antenna, it is possible to read the RFID tag with the second dipole antenna. Therefore, the readable area can be further widened. As a result, the number of reader devices provided in one table can be reduced, thereby reducing the cost.

It is noted that, preferably, the reader module includes a first RFIC element supplying a high frequency signal to the first dipole antenna, a second RFIC element supplying a high frequency signal to the second dipole antenna, and a controller switching high frequency signal supply operations of the first RFIC element and the second RFIC element in a time division manner. With this configuration, since the controller switches the high frequency signal supply operations of the first RFIC element and the second RFIC element in a time division manner, interference of radio waves can be suppressed.

Further, preferably, the controller changes a ratio of switching in a time division manner the high frequency signal supply operations of the first RFIC element and the second RFIC element in accordance with a number of RFID tags read through the first dipole antenna and a number of RFID tags read through the second dipole antenna. With this configuration, for example, it is possible to improve reading sensitivity of the RFID tag by supplying for a longer period the high frequency signal to a dipole antenna having a larger number of read RFID tags.

Further, preferably, the reader module includes an RFIC element supplying a high frequency signal, a switch switching to which one of the first dipole antenna and the second dipole antenna the high frequency signal of the RFIC element is supplied, and a controller configured to control a high frequency signal supply operation of the RFIC element and a switching operation of the switch. With this configuration, since the controller controls the high frequency signal supply operation of the RFIC element and the switching operation of the switch, interference of radio waves can be suppressed.

Further, preferably, the controller changes an interval for switching the switch in accordance with a number of RFID tags read through the first dipole antenna and a number of RFID tags read through the second dipole antenna. With this configuration, for example, it is possible to improve reading sensitivity of the RFID tag by supplying for a longer period the high frequency signal to a dipole antenna having a larger number of read RFID tags.

Further, preferably, at least one of the first dipole antenna and the second dipole antenna is a folded dipole antenna. With this configuration, interference of radio waves can be further suppressed. Further, even when a metal body is arranged near an end portion of the dipole antenna, it is possible to prevent directivity and gain of the dipole antenna from being hindered by the metal body.

Further, the case is preferably a thin case including a main surface having a vertical dimension and a lateral dimension that are large compared to a thickness dimension, the main surface is rectangular or substantially rectangular as viewed from a thickness direction of the case, the first element axis is arranged near a first side of the main surface of the case and along the first side, and the second element axis is arranged near a second side orthogonal to the first side of the main surface of the case and along the second side. In this configuration, the first dipole antenna and the second dipole antenna are arranged to be orthogonal or substantially orthogonal to each other. As a result, the overlapping area between a donut-shaped radiation pattern with the first element axis being the center and the donut-shaped radiation pattern with the second element axis being the center can be reduced, and hence the readable area can be further widened.

Further, preferably, the first dipole antenna is arranged so as to be unevenly distributed on a third side of the main surface of the case that opposes the second side, and the second dipole antenna is arranged so as to be unevenly distributed on a fourth side of the main surface of the case that opposes the first side. In this configuration, the first dipole antenna and the second dipole antenna are positioned apart from each other in a different direction from a portion where the first side and the second side are orthogonal. As a result, it is possible to suppress radio waves of one dipole antenna from being affected by a radiation conductor of the other dipole antenna.

In addition, the reader module can include an external communication antenna. With this configuration, information of the RFID tag read by the reader module can be transmitted to a shop side terminal or the like.

In another exemplary aspect, a table with a reader device is provided according to one exemplary embodiment of the present disclosure. In this aspect, the table includes a top plate part on which an article to which an RFID tag is attached is placed on a front surface side; and a reader device attached to a rear surface side of the top plate part and reading information of the RFID tag. In this aspect, the reader device includes an antenna element communicating with the RFID tag; a reader module electrically connected to the antenna element and reading information of the RFID tag through the antenna element; and a case housing the antenna element and the reader module. Moreover, the antenna element includes a first dipole antenna having a first element axis extending in a first direction that is along a main surface of the top plate part; and a second dipole antenna having a second element axis extending in a second direction that is along the main surface of the top plate part and crosses the first direction.

In the above configuration, since the first dipole antenna and the second dipole antenna are provided as the antenna element, the antenna element has a donut-shaped radiation pattern with each of the first element axis and the second element axis being the center, and thus the readable area can be made wider.

Further, in the above configuration, the first dipole antenna and the second dipole antenna are arranged so that the first element axis crosses the second element axis. Thus, for example, even when the RFID tag is positioned in the extending direction of the two elements of the first dipole antenna, it is possible to read the RFID tag with the second dipole antenna. Therefore, the readable area can be further widened. As a result, it is possible to reduce the number of reader devices provided in one table, thereby reducing the cost.

Hereinafter, a reader device and a table with a reader device according to exemplary embodiments will be described with reference to the attached drawings. In the drawings, substantially the same members are denoted by the same reference numerals.

First Embodiment

FIG. 1 is a block diagram illustrating a schematic configuration of a reader device according to a first embodiment.

As illustrated in FIG. 1, a reader device 1 according to the first embodiment includes an antenna element 2 configured to communicate with an RFID tag attached to an article such as a clothing article, and a reader module 3 electrically connected to the antenna element 2 and configured to read information of the RFID tag through the antenna element 2. The antenna element 2 and the reader module 3 are accommodated in a case 4.

Figure 2:
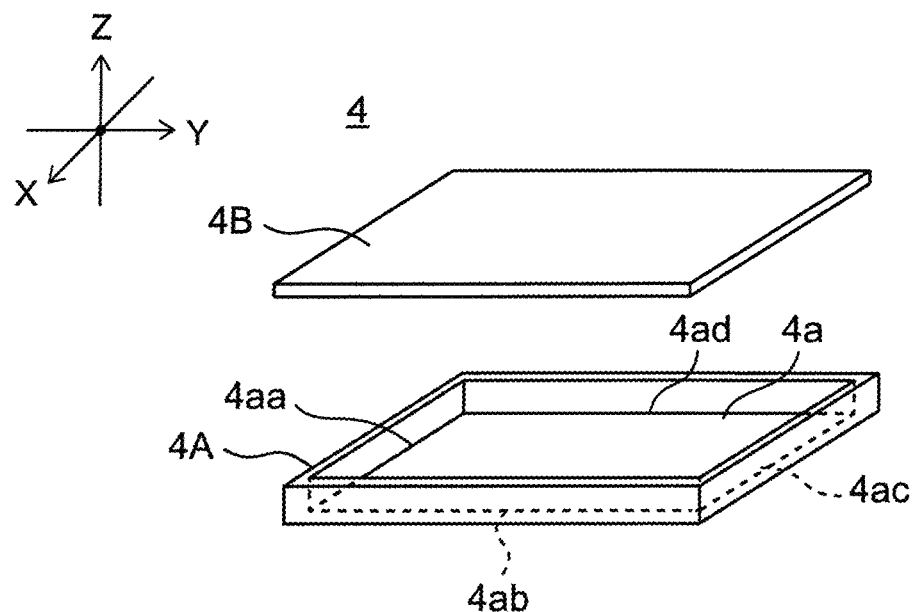
FIG. 2 is an exploded perspective view of a case which the reader device of FIG. 1 has.

FIG. 2 is an exploded perspective view of the case 4. As illustrated in FIG. 2, the case 4 is a thin rectangular parallelepiped casing having a short length in a Z direction which is a thickness direction. In other words, the case 4 is a flat casing in which the area of a surface (mounting surface to a table or the like) as viewed from the Z direction is the maximum. The case 4 is made of a non-metallic material such as resin so that radio waves can pass through. The case 4 includes a container 4A having an open top and a lid 4B covering a top opening of the container 4A. A bottom wall of the container 4A is formed in a rectangular or substantially rectangular shape as viewed from the Z direction. In the first embodiment, an upper surface of the bottom wall is the main surface 4a of the case 4. Each side of the bottom wall of the container 4A is, for example, 10 cm or more. The area of the bottom wall of the container 4A is, for example, 100 cm$^2$ or more. The height of the case 4 in the Z direction is, for example, 4 cm or less.

In addition, an elastic member (not illustrated) such as a sponge having notches corresponding to shapes of respective parts of the antenna element 2 and the reader module 3 may be provided in the container 4A, and the parts of the antenna element 2 and the reader module 3 may be arranged in the notches. In this manner, the parts of the antenna element 2 and the reader module 3 can be positioned so that the parts do not move within the container 4A.

As illustrated in FIG. 1, the antenna element 2 includes a first dipole antenna 21 and a second dipole antenna 22. The first dipole antenna 21 and the second dipole antenna 22 are, for example, electric field type antennas using the UHF band as a communication frequency band.

The first dipole antenna 21 is electrically connected to the reader module 3 via a coaxial cable 23. The first dipole antenna 21 has a first element axis 21A extending in an X direction (first direction) that is along (i.e., extends in parallel) the main surface 4a of the case 4. The first element axis 21A is arranged near (i.e., adjacent to) a first side 4aa of the main surface 4a of the case 4 along the first side 4aa.

The second dipole antenna 22 is electrically connected to the reader module 3 via the coaxial cable 24. The second dipole antenna 22 has a second element axis 22A extending in a Y direction (second direction) that is along (i.e., extends in parallel) the main surface 4a of the case 4 and crosses the X direction. The second element axis 22A is arranged near (i.e., adjacent to) a second side 4ab orthogonal to the first side 4aa of the main surface 4a of the case 4 and along the second side 4ab. In the first embodiment, the X direction, the Y direction, and the Z direction are orthogonal to each other.

Figure 3:
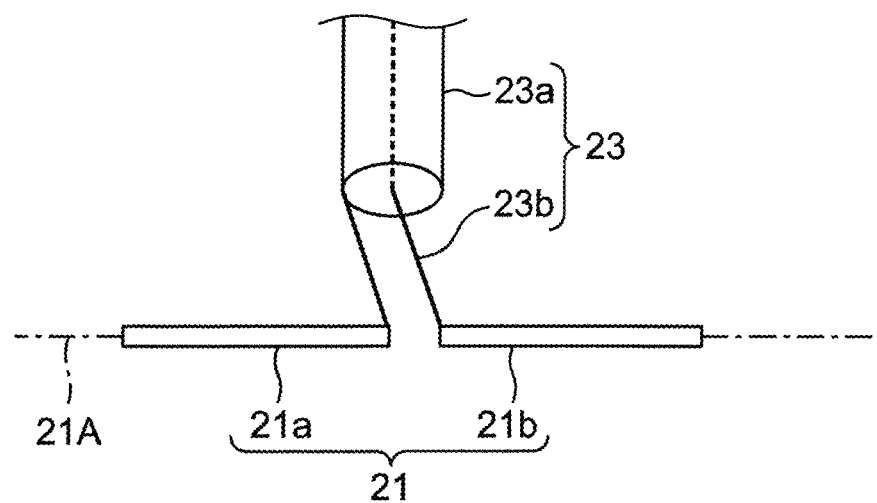
FIG. 3 is a schematic view of a connecting part between a coaxial cable and a dipole antenna.

FIG. 3 is a schematic view of a connecting portion between the first dipole antenna 21 and the coaxial cable 23. As illustrated in FIG. 3, the first dipole antenna 21 includes a first radiation conductor (first element) 21a and a second radiation conductor (second element) 21b. The first radiation conductor 21a and the second radiation conductor 21b extend on the first element axis 21A. Each of the first radiation conductor 21a and the second radiation conductor 21b has a length (element length) of ¼ wavelength. The first radiation conductor 21a and the second radiation conductor 21b are each formed in a straight bar shape.

The coaxial cable 23 includes a tubular outer conductor 23a and a linear inner conductor 23b arranged inside the outer conductor 23a. The outer conductor 23a is connected to one end of the first radiation conductor 21a of the first dipole antenna 21. The inner conductor 23b is connected to one end of the second radiation conductor 21b of the first dipole antenna 21.

The second dipole antenna 22 has the same configuration as the first dipole antenna 21. The coaxial cable 23 also has the same configuration as the coaxial cable 24. Therefore, the connecting portion between the second dipole antenna 22 and the coaxial cable 24 has the same configuration as the connecting portion between the first dipole antenna 21 and the coaxial cable 23. Accordingly, the explanation of these configurations will be omitted here.

As illustrated in FIG. 1, the reader module 3 includes a first RFIC element 31, a second RFIC element 32 for RFID communication, a controller 33, an RFIC element 34, and an external communication antenna 35.

The first RFIC element 31 is an integrated circuit element for a reader device in an RFID system. The first RFIC element 31 is connected to the first dipole antenna 21 with the coaxial cable 23, and is configured to supply a high frequency signal to the first dipole antenna 21.

The second RFIC element 32 is an integrated circuit element for a reader device in the RFID system. The second RFIC element 32 is connected to the second dipole antenna 22 with the coaxial cable 24, and is configured to supply a high frequency signal to the second dipole antenna 22. The first RFIC element 31 and the second RFIC element 32 are connected to the controller 33.

The controller 33 is configured to switch high frequency signal supply operations of the first RFIC element 31 and the second RFIC element 32 in a time division manner. The interval for time-divisionally switching the high frequency signal supply operation of the first RFIC element 31 and the high frequency signal supply operation of the second RFIC element 32 is, for example, one second. The controller 33 is connected to the RFIC element 34.

In an exemplary aspect, the RFIC element 34 is an integrated circuit element for WiFi (registered trademark)/Bluetooth (registered trademark) communication and is connected to the external communication antenna 35.

Moreover, the external communication antenna 35 is, for example, a UHF-band or SHF-band antenna that communicates with a shop side antenna using WiFi (registered trademark)/Bluetooth (registered trademark).

Figure 4:
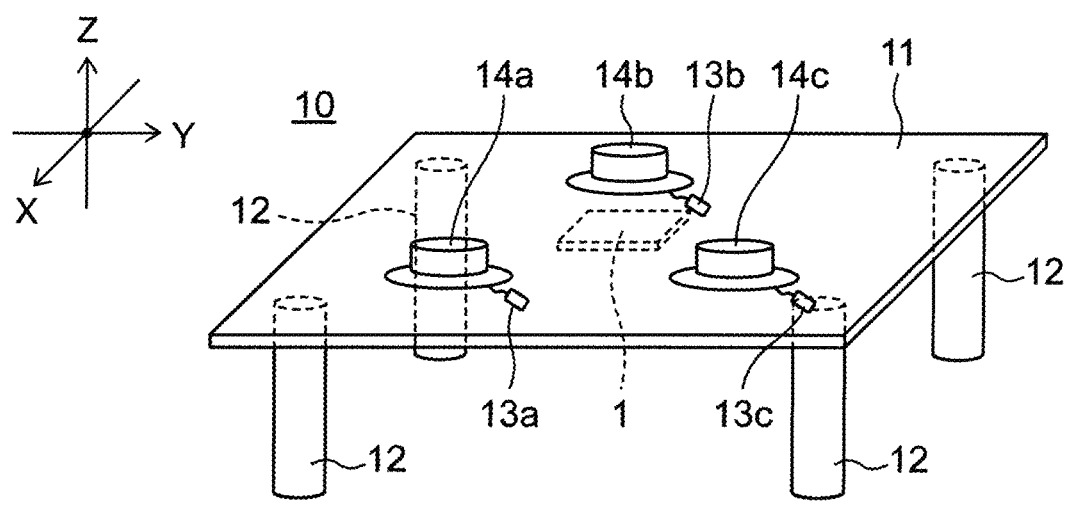
FIG. 4 is a perspective view illustrating a schematic configuration of a table with a reader device including the reader device of FIG. 1.

FIG. 4 is a perspective view illustrating a schematic configuration of a table 10 with a reader device including the reader device 1. As illustrated in FIG. 4, the table 10 with the reader device includes a top plate part 11 and four leg parts 12 for supporting the top plate part 11 from below.

The top plate part 11 (or simply the "top plate") is formed in, for example, a rectangular plate shape. On a front surface side of the top plate part 11, articles 14a to 14c with RFID tags 13a to 13c attached thereto are placed (displayed) on the front surface side. In the first embodiment, the RFIC tags 13a to 13c are attached to the articles 14a to 14c, respectively, with strings. Although FIG. 4 illustrates an example in which the articles 14a to 14c are hats, it should be appreciated that the articles may be anything as long as inventory management and security-related management with RFID tags are possible for them.

The reader device 1 is attached to a rear surface side of the top plate part 11. In the first embodiment, the reader device 1 is attached to the rear surface side of the top plate part 11 by gluing a surface of the lid 4B of the case 4 to a center portion of the rear surface of the top plate part 11. Further, the reader device 1 is arranged so that the main surface 4a of the case 4 is in parallel to the main surface of the top plate part 11.

Figure 5:
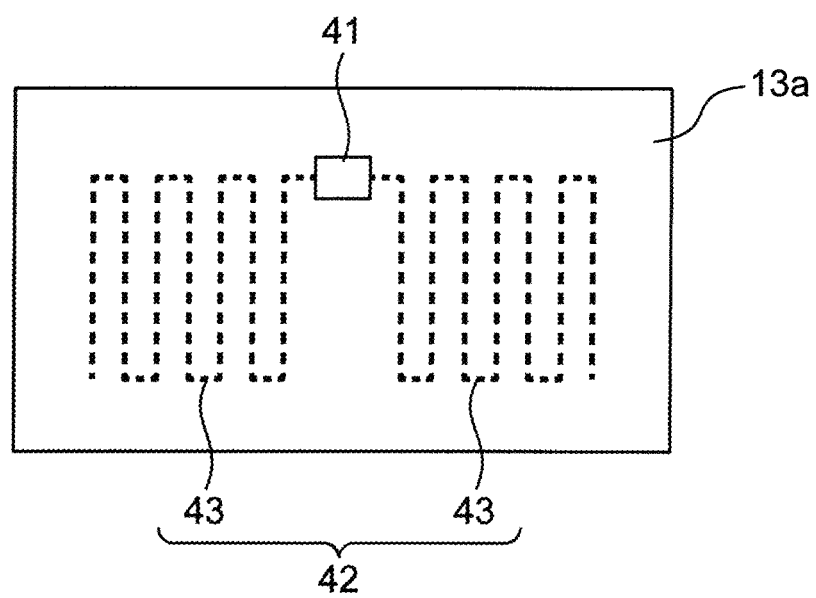
FIG. 5 is a schematic view illustrating an example of an RFID tag attached to an article.

FIG. 5 is a schematic view illustrating an example of the RFID tag 13a. As illustrated in FIG. 5, the RFID tag 13a includes an RFIC element 41 which is an integrated circuit element for a tag in the RFID system and a dipole antenna 42. The dipole antenna 42 includes two antenna elements 43, 43 extending in a meander shape on both sides across the RFIC element 41. Since the RFID tags 13b, 13c have the same configuration as the RFIC tag 13a, the explanation thereof will be omitted here. According to the exemplary aspect, these RFID tags 13a to 13c are tags configured to use the UHF band as a communication frequency band and form a UHF band RFID system as a whole.

The reader device 1 according to the first embodiment includes the first dipole antenna 21 and the second dipole antenna 22 as the antenna element 2. The first dipole antenna 21 has a donut-shaped radiation pattern around the first element axis 21A. Further, the second dipole antenna 22 has a donut-shaped radiation pattern around the second element axis 22A. Thus, the readable area can be widened.

Further, in the reader device 1 according to the first embodiment, the first dipole antenna 21 and the second dipole antenna 22 are arranged so that the first element axis 21A and the second element axis 22A cross (i.e., intersection with) each other. Thus, for example, even when the RFID tags 13a to 13c are positioned in the extending direction of the first element axis 21A, it is possible for the second dipole antenna 22 to read the RFID tags 13a to 13c. Therefore, the readable area can be further widened. As a result, the number of reader devices 1 provided in one table can be reduced, and the cost can be reduced.

Further, in the reader device 1 according to the first embodiment, since the controller 33 switches the high frequency signal supply operations of the first RFIC element 31 and the second RFIC element 32 in a time division manner, interference of radio waves can be suppressed.

Further, in the reader device 1 according to the first embodiment, the RFIC element that supplies a high frequency signal to the first dipole antenna 21 and the RFIC element that supplies a high frequency signal to the second dipole antenna 22 are separately provided. With this configuration, the high frequency signal of the RFIC element is not distributed to the first dipole antenna 21 and the second dipole antenna 22, but is supplied only to either one of the first dipole antenna 21 and the second dipole antenna 22. Therefore, radio waves of the first dipole antenna 21 and the second dipole antenna 22 can be strengthened when supplied thereto, respectively.

Further, in the reader device 1 according to the first embodiment, the first element axis 21A is arranged near (i.e., adjacent to) the first side 4aa of the main surface 4a of the case 4 and along the first side 4aa. The second element axis 22A is arranged near (i.e., adjacent to) the second side 4ab orthogonal to the first side 4aa of the main surface 4a of the case 4 and along the second side 4ab. Thus, the first dipole antenna 21 and the second dipole antenna 22 are arranged to be orthogonal or substantially orthogonal to each other. As a result, it is possible to reduce the overlapping area between the donut-shaped radiation pattern with the first element axis 21A being the center and the donut-shaped radiation pattern with the second element axis 22A being the center, so as to further widen the readable area.

Further, in the reader device 1 according to the first embodiment, since the reader module 3 includes the external communication antenna 35, information of the RFID tag read by the reader module 3 can be transmitted to an external terminal such as a shop side terminal.

It should be noted that the present disclosure is not limited to the first embodiment, and can be implemented in various other modes. For example, in the above description, the interval at which the controller 33 switches the high frequency signal supply operations of the first RFIC element 31 and the second RFIC element 32 in a time division manner is set to an equal interval (1 second), but the present disclosure is not limited to this interval. For example, in accordance with the number of RFID tags read through the first dipole antenna 21 and the number of RFID tags read through the second dipole antenna 22, the controller 33 may change the ratio of switching the high frequency signal supply operations of the first RFIC element 31 and the second RFIC element 32 in a time division manner. For example, when the number of RFID tags read through the first dipole antenna 21 is "3" and the number of RFID tags read through the second dipole antenna is "0", there is no RFID tag that can be read when a high frequency signal is supplied to the second dipole antenna 22. In this case, in order to read the RFID tag, it is necessary to wait for the high frequency signal supply operation of the second RFIC element 32 to end, resulting in decreased reading sensitivity of the RFID tag. In this case, preferably, for example, the period of the high frequency signal supply operation of the first RFIC element 31 is prolonged (to, for example, 1.5 seconds) and the period of the high frequency signal supply operation of the second RFIC element 32 is shortened (to, for example, 0.5 seconds). Thus, it is possible to improve the reading sensitivity of the RFID tag by supplying the high frequency signal to the first dipole antenna 21 having the larger number of read RFID tags for a longer period.

Note that the above-described changing of the ratio of switching in a time division manner can be performed by the controller 33 or can be performed by a controller of an external terminal such as a shop side terminal.

Further, the controller 33 can be configured to control the high frequency signal supply operations of the first RFIC element 31 and the second RFIC element 32 to be alternately and continuously performed, or can control the high frequency signal supply operations to be alternately and intermittently performed. For example, after the high frequency signal supply operation of the first RFIC element 31 is performed for 5 seconds, the operation is stopped for seconds, the high frequency signal supply operation of the second RFIC element 32 is performed for 1 second, and then the operation is stopped for 2 seconds. The controller 33 can further control the high frequency signal supply operations of the first RFIC element 31 and the second RFIC element 32 so as to repeat this operation. As a result, energy saving of the reader device 1 can be achieved.

Figure 6:
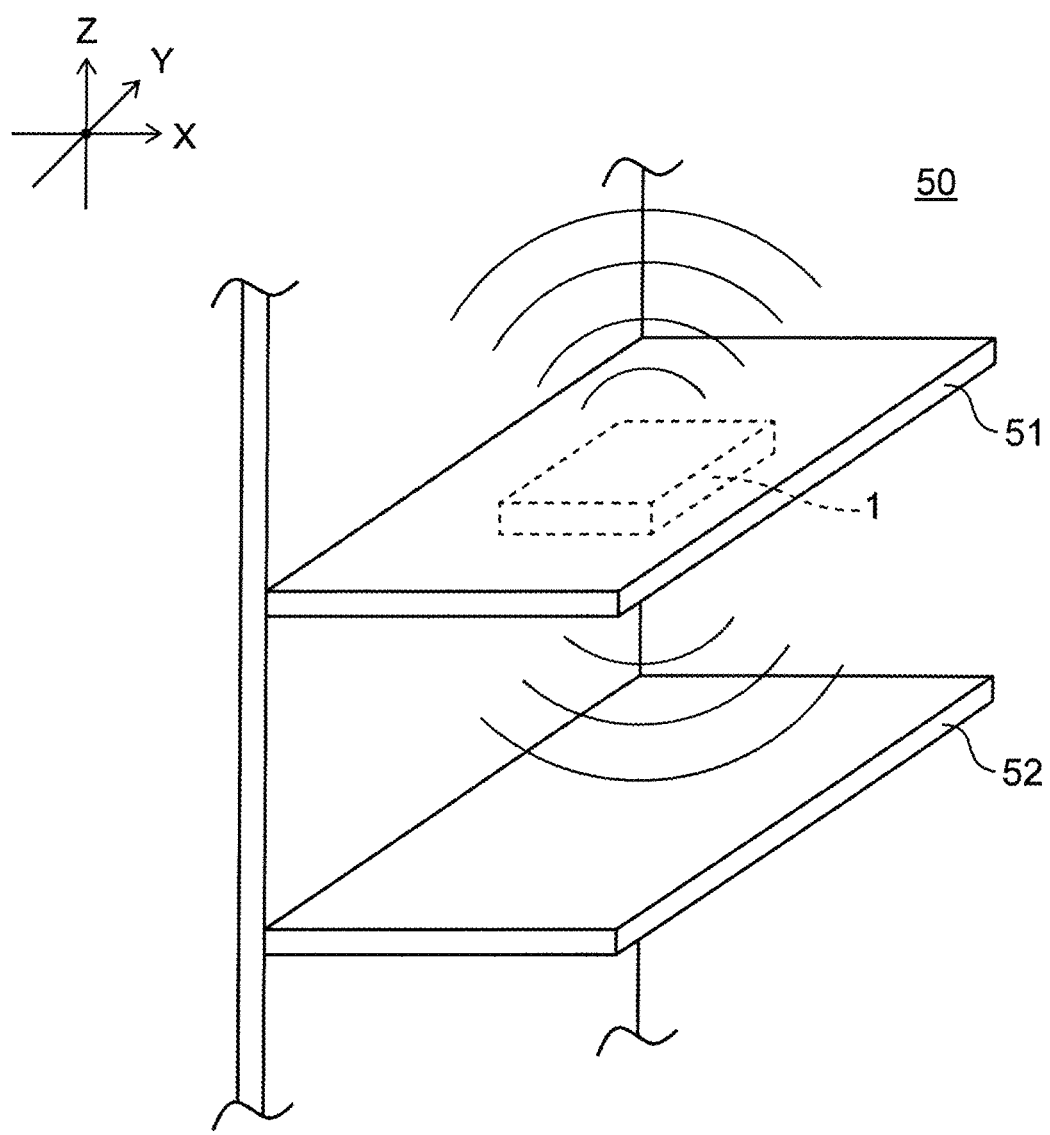
FIG. 6 is a perspective view illustrating a state in which the reader device of FIG. 1 is attached to a multistage shelf.

In the above description, the reader device 1 is attached to the rear surface side of the top plate part 11 of the table, but the present disclosure is not limited thereto. For example, the reader device 1 may be attached to the front surface side of the top plate part 11 of the table. Further, the reader device 1 can be configured not to be on a table but to be hung from a hanger pipe, or may be attached to a side wall. Further, as illustrated in FIG. 6, the reader device 1 may be attached to a multistage shelf 50 having two or more shelf boards 51, 52 arranged in the vertical direction (Z direction). Specifically, the reader device 1 may be attached to a rear surface of the shelf board 51. With this configuration, since the reader device 1 includes the first dipole antenna 21 and the second dipole antenna 22 and also has directivity in the vertical direction, the reader device 1 can read RFID tags attached to articles displayed on the shelf board 51 and the shelf board 52.

In the above description, the reader module 3 and the first dipole antenna 21 are connected with the coaxial cable 23, but the present disclosure is not limited thereto. For example, the reader module 3 and the first dipole antenna 21 may be electrically connected with two cables. Similarly, the reader module 3 and the second dipole antenna 22 may be electrically connected with two cables instead of the coaxial cable 24.

Figure 7:
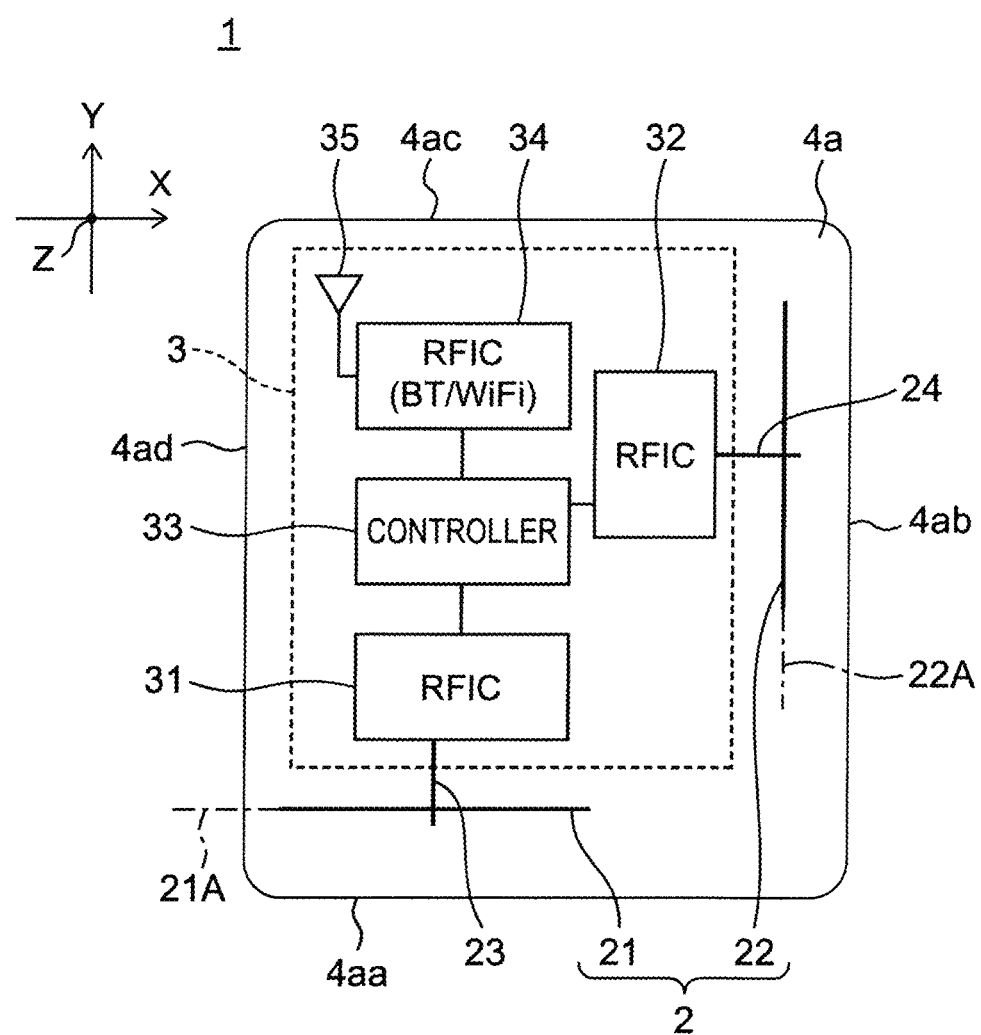
FIG. 7 is a schematic diagram illustrating a modification example of the reader device of FIG. 1.

In the above description, as illustrated in FIG. 1, the second dipole antenna 22 is arranged so as to be unevenly distributed on the first side 4aa side of the main surface 4a of the case 4, but the present disclosure is not limited thereto. As illustrated in FIG. 7, the second dipole antenna 22 is preferably arranged so as to be unevenly distributed towards a third side 4ac side of the main surface 4a of the case 4 opposing the first side 4aa. Further, preferably, the first dipole antenna 21 is arranged so as to be unevenly distributed towards a fourth side 4ad side of the main surface 4a of the case 4 opposing the second side 4ab. In this configuration, the first dipole antenna 21 and the second dipole antenna 22 are located apart from each other in a different direction from a portion where the first side 4aa and the second side 4ab are orthogonal. As a result, it is possible to suppress the effect that radio waves of one dipole antenna are affected by the radiation conductor of the other dipole antenna.

Further, in this case, preferably, the external communication antenna 35 is arranged near a portion where the third side 4ac and the fourth side 4ad are orthogonal. In this configuration, the external communication antenna 35 is located away from the first dipole antenna 21 and the second dipole antenna 22. As a result, interference of radio waves from the external communication antenna 35 with radio waves from the first dipole antenna 21 and radio waves from the second dipole antenna 22 can be suppressed.

Figure 8:
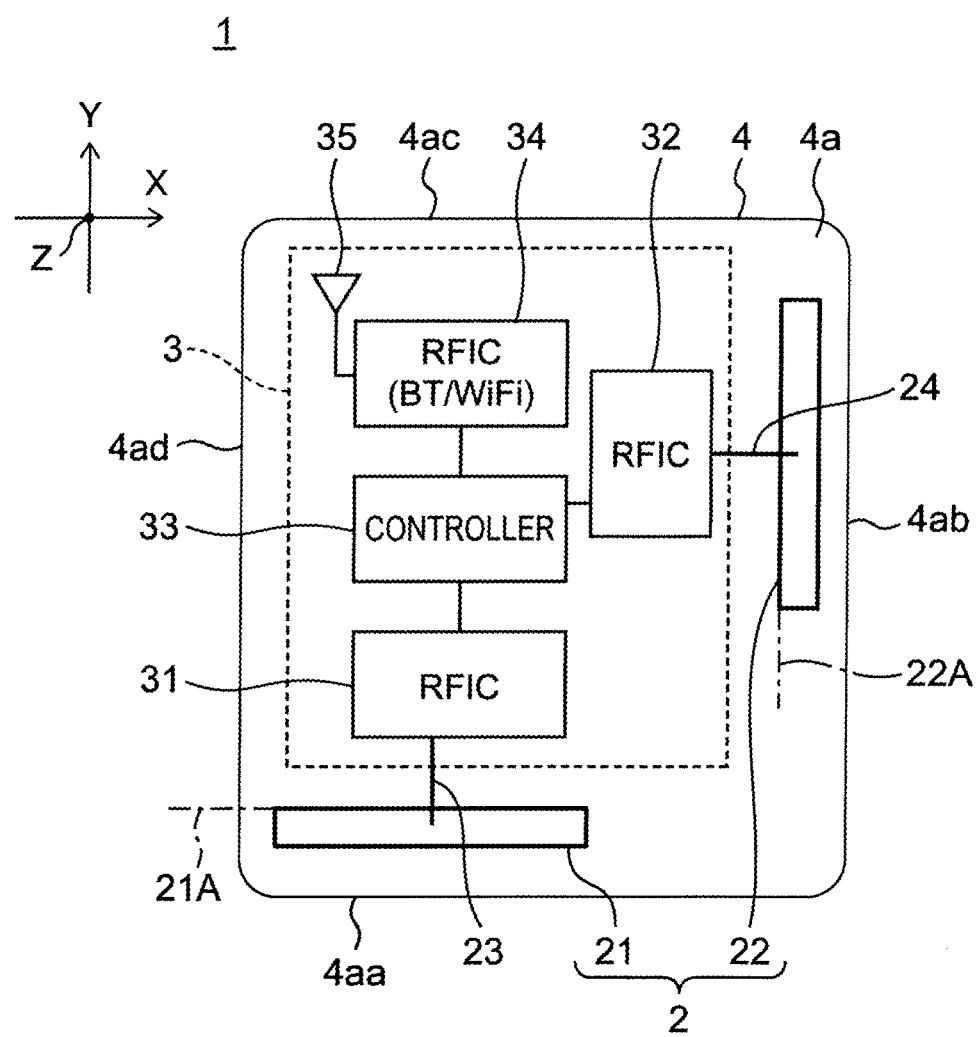
FIG. 8 is a schematic diagram illustrating a modification example of the reader device of FIG. 1.

In the above description, the first dipole antenna 21 and the second dipole antenna 22 are configured such that the two radiation conductors 21a, 21b are formed in a straight rod shape, but the present disclosure is not limited thereto. For example, the two radiation conductors 21a, 21b may have bent portions in a part thereof. In addition, as illustrated in FIG. 8, the first dipole antenna 21 and the second dipole antenna 22 may be folded dipole antennas. It is noted that the folded dipole antenna is an antenna having a structure in which another radiation conductor is provided in parallel with two radiation conductors with a total length of ½ wavelength and both ends of each radiation conductor are connected. This folded dipole antenna has such a characteristic that it is difficult for an electric field to be radiated outward (in an element axis direction) from folding back portions at both end portions. Thus, it is possible to further suppress degradation of the characteristics of the antennas due to interference between the antennas. Further, even when a metal body is arranged near an end portion of the dipole antenna, it is possible to prevent directivity and gain of the dipole antenna from being hindered by the metal body.

Further, in the above description, the RFID tags 13a to 13c are attached to the articles 14a to 14c with strings, but the present disclosure is not limited thereto. For example, as long as the RFID tags 13a to 13c are associated with the articles 14a to 14c, the RFID tags 13a to 13c may be arranged at positions physically separated from the articles 14a to 14c.

Further, in the above description, the reader module 3 includes the external communication antenna 35, but the present disclosure is not limited thereto. The reader module 3 may not include the external communication antenna 35, and may have a storage unit that accumulates information of the read RFID tag, for example.

Further, the reader module 3 may include a driving battery (see the battery 36 in FIG. 9) that supplies power to the first RFIC element 31, the second RFIC element 32, the controller 33, and the RFIC element 34.

In the above description, the reader device 1 has the reader function of reading information of an RFID tag, but the present disclosure is not limited thereto. For example, the reader device 1 may be configured to have a reader/writer function to read information of an RFID tag and to write information to an RFID tag.

In the above description, the case 4 is a rectangular parallelepiped casing, but the present disclosure is not limited thereto. For example, the case 4 may have a shape without a side wall such as an envelope.

Figure 9:
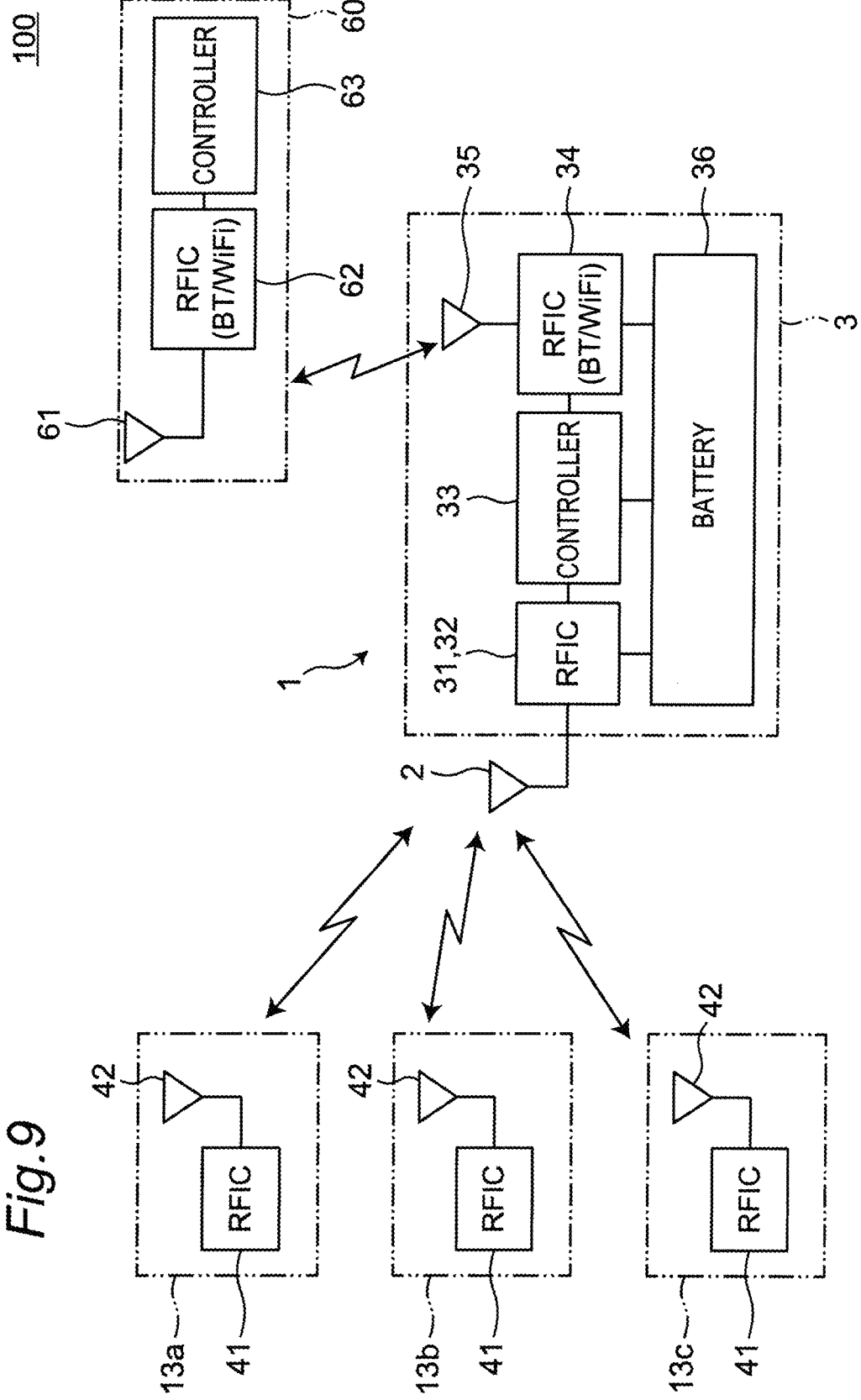
FIG. 9 is a block diagram illustrating a schematic configuration of an article management system using the reader device of FIG. 1.

Next, an article management system that manages a plurality of articles 14a to 14c using the reader device 1 according to the first embodiment will be described. FIG. 9 is a block diagram illustrating a schematic configuration of an article management system 100 using the reader device according to the first embodiment of the present disclosure.

As illustrated in FIG. 9, the article management system 100 includes a reader device 1 and a shop side terminal 60 that communicates with the reader device 1 and manages a plurality of articles.

The reader module 3 of the reader device 1 includes a battery 36 in addition to the first RFIC element 31, the second RFIC element 32, the controller 33, the RFIC element 34, and the external communication antenna 35. In FIG. 9, the first RFIC element 31 and the second RFIC element 32 are illustrated as one RFIC element.

The external communication antenna 35 is an antenna that communicates with a shop side antenna 61, for example, in the UHF band or the SHF band. The external communication antenna 35 and the shop side antenna 61 have a communication distance of, for example, 10 m or more and 100 m or less and perform near field wireless communication using the communication frequency band of 2.4 GHz band or 5 GHz band. Further, the antenna element 2 and the dipole antenna 42 of the RFID tags 13a to 13c perform communication using the 900 MHz band. Communication between the external communication antenna 35 and the shop side antenna 61 and communication between the antenna element 2 and the respective dipole antennas 42 are different in communication frequency band and intensity and characteristics of radio waves. Therefore, interference of radio waves is suppressed. The antenna used in the near field communication system is a resonance type antenna. The battery 36 supplies electric power to the first RFIC element 31, the second RFIC element 32, the controller 33, and the RFIC element 34.

The shop side terminal 60 includes a shop side antenna 61, an RFIC element 62, and a controller 63.

The shop side antenna 61 is an antenna communicating with the external communication antenna 35 of the reader device 1. The shop side antenna 61 performs short-distance wireless communication in, for example, the UHF band or the SHF band with respect to the external communication antenna 35 of the reader device 1.

In the exemplary aspect, the RFIC element 62 is an element for WiFi (registered trademark)/Bluetooth (registered trademark) communication, and is connected to the shop side antenna 61.

The controller 63 is for managing information of an RFID tag. More specifically, the controller 63 manages a take-out history of articles and the like. For example, the controller 63 detects readability of a specific RFID tag in real time, and manages a history including the number of times that an article with a specific RFID tag is taken from the table and returned thereafter. Thus, inventory management of a plurality of articles can be performed more accurately. Note that the controller 63 may perform article management in conjunction with the accounting process.

In the above description, communication between the shop side terminal 60 and the reader module 3 of the reader device 1 is performed wirelessly, but the present disclosure is not limited thereto. Communication between the shop side terminal 60 and the reader module 3 of the reader device 1 may be performed by wired communication.

Second Embodiment

Figure 10:
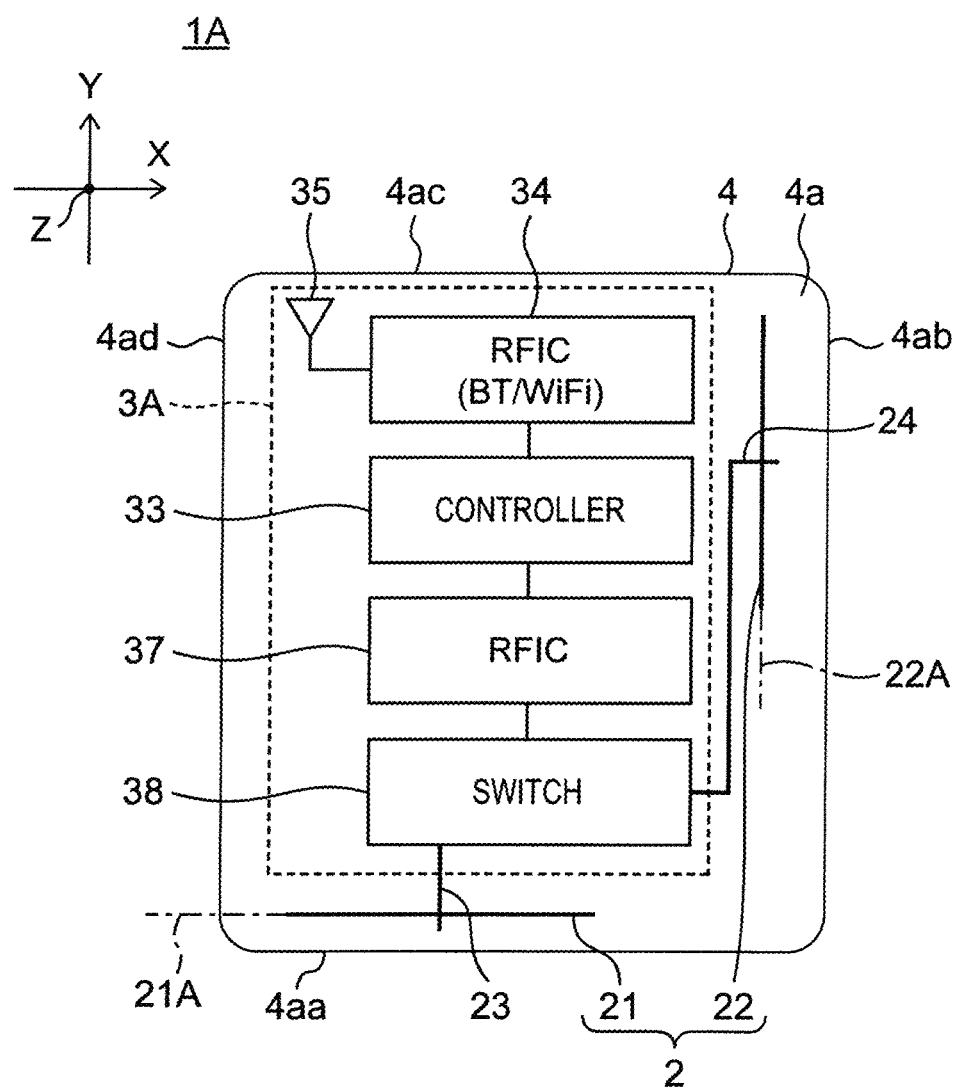
FIG. 10 is a block diagram illustrating a schematic configuration of a reader device according to a second embodiment of the present disclosure.

FIG. 10 is a schematic diagram of a reader device 1A according to a second embodiment.

The reader device 1A according to the second embodiment is different from the reader device 1 according to the first embodiment in that a reader module 3A is configured to include an RFIC element 37 and a switch 38 instead of the first RFIC element 31 and the second RFIC element 32.

The RFIC element 37 is an RFIC element for RFID communication. The RFIC element 37 is connected to the switch 38, and the RFIC element 37 supplies a high frequency signal to the switch 38.

The switch 38 is configured to switch to which one of the first dipole antenna 21 and the second dipole antenna 22 the high frequency signal of the RFIC element 37 is supplied. The switch 38 is connected to the first dipole antenna 21 with the coaxial cable 23 and to the second dipole antenna 22 with the coaxial cable 24.

The controller 33 is connected to the RFIC element 37 and the switch 38. The controller 33 controls the high frequency signal supply operation of the RFIC element 37 and the switching operation of the switch 38. Further, the controller 33 changes the interval of switching the switch 38 in response to the number of RFID tags read through the first dipole antenna 21 and the number of RFID tags read through the second dipole antenna 22. For example, when the number of RFID tags read through the first dipole antenna 21 is "3" and the number of RFID tags read through the second dipole antenna 22 is "1", the switch 38 is switched so as to supply the high frequency signal for a long period by the first dipole antenna 21.

By the reader device 1A of the second embodiment, since the controller 33 controls the high frequency signal supply operation of the RFIC element 37 and the switching operation of the switch 38, interference of radio waves can be suppressed.

In the reader device 1A according to the second embodiment, the controller 33 changes, in accordance with the number of RFID tags read through the first dipole antenna 21 and the number of RFID tags read through the second dipole antenna 22, the interval at which the switch is switched. With this configuration, reading sensitivity of the RFID tag can be improved by, for example, supplying a high frequency signal to the first dipole antenna 21 having a larger number of read RFID tags for a longer period.

Third Embodiment

Figure 11:
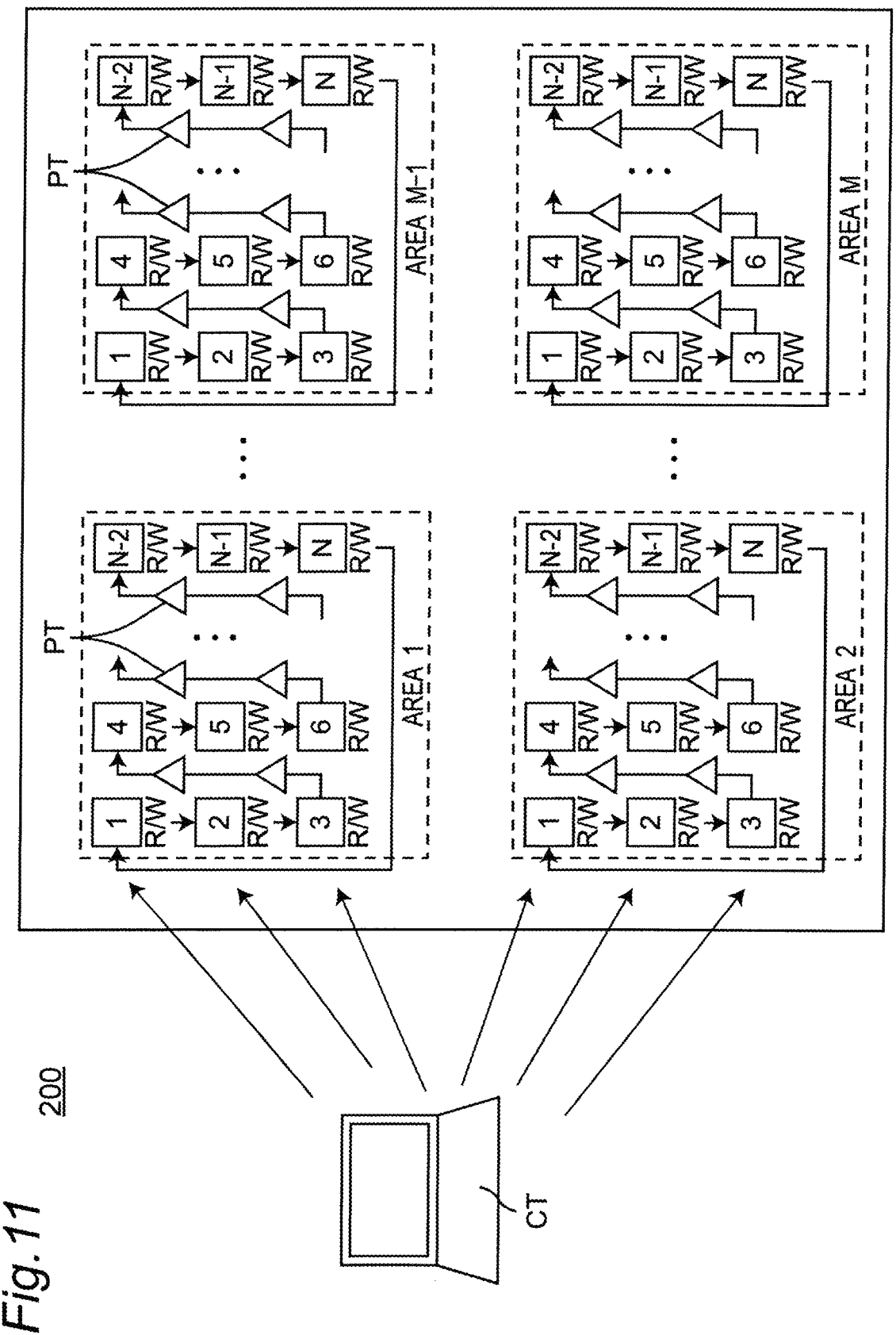
FIG. 11 is a block diagram illustrating a schematic configuration of an article management system according to a third embodiment of the present disclosure.

FIG. 11 is a block diagram illustrating a schematic configuration of an article management system 200 according to a third embodiment of the present disclosure. The article management system 200 is an article management system that manages a large number of articles using a plurality of reader devices 1 or 1A. Here, it is assumed that the reader device 1 or 1A has the reader/writer function and is described as "R/W". In addition, in order to distinguish the plurality of reader devices 1A or 1A, "reader/writer R/W1" to "reader/writer R/WN" (N is a natural number) are described.

If a plurality of reader/writers R/W1 to R/WN are arranged at a short distance, radio waves may interfere with each other between the reader/writers R/W1 to R/WN even if the channels are made different. Therefore, in the article management system 200, a plurality of reader/writers R/W1 to R/WN arranged in one area are operated one by one in a time division manner.

Specifically, as illustrated in FIG. 11, an area in which a large number of articles are arranged is divided into M (M is a natural number) areas, and a plurality of reader/writers R/W1 to R/WN are provided in each of the areas 1 to M. Each of operations of reading RFID tags by a plurality of reader/writers R/W1 to R/WN (hereinafter simply referred to as "operation") of each of the areas 1 to M is controlled by a central terminal CT. The central terminal CT controls so that the reader/writers R/W at equal distances from each other (reader/writers R/W denoted by the same reference numeral in FIG. 11) are operated simultaneously in each of the areas 1 to M. In FIG. 11, in order to make the diagram easy to view, the central terminal CT is illustrated to control operations of the RFID tags by the plurality of reader/writers R/W1 to R/W3 in the areas 1 and 2.

Figure 12:
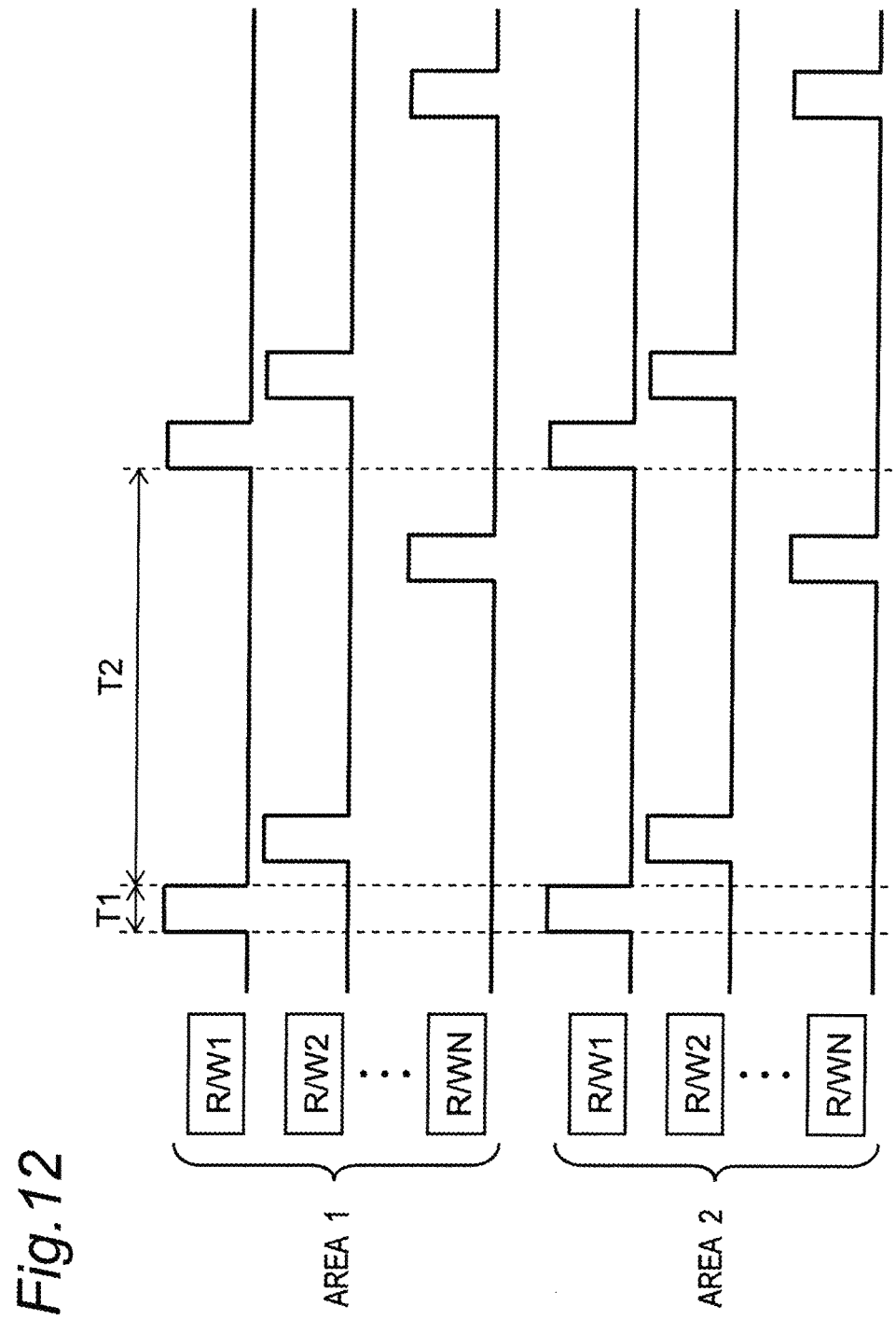
FIG. 12 is a chart illustrating operation timings of a plurality of reader/writers arranged in each area in the article management system of FIG. 11.

FIG. 12 is a chart illustrating operation timings of the plurality of reader/writers R/W1 to R/WN arranged in the area 1 and the area 2. In FIG. 12, T1 is a read time for operating the reader/writers R/W. T2 is an idle time for suspending the reader/writers R/W.

As illustrated in FIG. 12, the central terminal CT transmits a start command instructing the start of operation to each reader/writer R/W1 arranged in each of the areas 1 to M, so as to make each reader/writer R/W1 operate for a time T1. Thereafter, the central terminal CT transmits a stop command instructing to stop operation to each reader/writer R/W1, so as to stop each reader/writer R/W1 for a time T2. Note that T2 is set to be longer than T1×N.

Further, after transmitting the stop command to each reader/writer R/W1, the central terminal CT transmits a start command to each reader/writer R/W2, so as to make each reader/writer R/W2 operate for the time T1. Thereafter, the central terminal CT transmits a stop command to each reader/writer R/W2, so as to stop each reader/writer R/W2 for the time T2.

Thereafter, similarly, after transmitting the stop command to each reader/writer R/WN, the central terminal CT transmits a start command to each reader/writer R/WN, so as to make each reader/writer R/WN operate for the time T1. Thereafter, the central terminal CT transmits a stop command to each reader/writer R/WN, so as to stop each reader/writer R/WN for the time T2.

In this manner, the central terminal CT intermittently operates the reader/writers R/W1 to R/WN arranged in each of the areas 1 to M in order at regular intervals. Information on RFID tags read by each of the reader/writers R/W1 to R/WN is aggregated and managed in the central terminal CT.

With the article management system 200 according to the third embodiment, mutual interference of radio waves among the reader/writers R/W1 to R/WN arranged in the same area can be suppressed without greatly reducing the number of reading operations.

Further, with the article management system 200 according to the third embodiment, the operations of the reader/writers R/W1 to R/WN arranged in the respective areas 1 to M can be centrally managed by the central terminal CT. Consequently, it is possible to prevent shifting of operation timings of the reader/writers R/W1 to R/WN, and the risk of mutual interference due to the shifting of operation can be reduced.

It is noted that the total time of the time T1 (read time) and the time T2 (idle time) needs to be the same among the reader/writers R/W1 to R/WN, but the ratio between the time T1 and the time T2 may be different among the reader/writers R/W1 to W/N as long as the read times do not overlap.

As illustrated in FIG. 11, in the article management system 200, a plurality of RFID tags (hereinafter referred to as position tags) PT for managing position information of each of the reader/writers R/W1 to R/WN may be installed in each of the areas 1 to M. Thus, for example, even if the arrangement of any one of the plurality of reader/writers R/W1 to R/WN is changed, based on the output of each position tag PT, it is possible to detect which one of the reader/writers R/W1 to R/WN is changed in arrangement. Therefore, even when the arrangement of the reader/writer R/W1 to R/WN is changed, it is possible to manage position information of the product without any change on the system.

Fourth Embodiment

Figure 13:
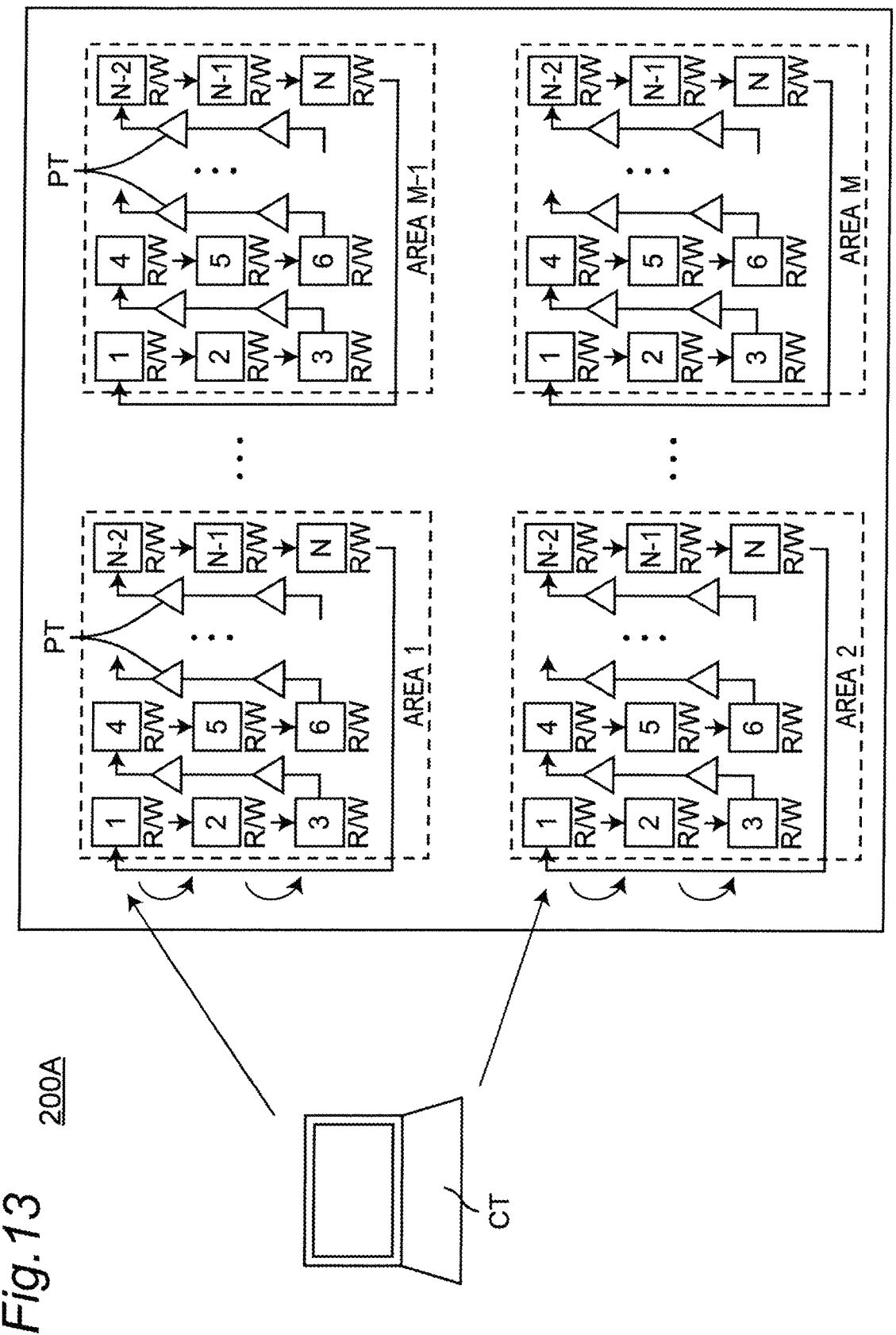
FIG. 13 is a block diagram illustrating a schematic configuration of an article management system according to a fourth embodiment of the present disclosure.

FIG. 13 is a block diagram illustrating a schematic configuration of an article management system 200A according to a fourth embodiment of the present disclosure. It is noted that in FIG. 13, in order to make the diagram easy to view, the central terminal CT is illustrated to control operations of the RFID tags by the reader/writers R/W1 in the areas 1 and 2.

The article management system 200A according to the fourth embodiment differs from the article management system 200 according to the third embodiment in that the central terminal CT is configured to transmit a start command only to each reader/writer R/W1 arranged in each of the areas 1 to M.

More specifically, the article management system 200A is configured such that each reader/writer R/W1 to R/WN operates sequentially for a time T1 as each reader/writer R/W1 receives a start command. For example, when each reader/writer R/W1 receives the start command, each reader/writer R/W1 is configured to directly transmit the start command to the reader/writer R/W2 arranged in the same areas 1 to M.

In the article management system 200A according to the fourth embodiment, after transmitting the start command to each reader/writer R/W1, the central terminal CT just needs to wait until receiving data from each reader/writer R/WN. Thereby, the amount of data communication of the central terminal CT can be reduced. Further, for example, it is possible to suppress the risk that each of the reader/writers R/W1 to R/WN arranged in each of the areas 1 to M fails to receive the start command or the stop command transmitted from the central terminal CT and does not operate.

Figure 14:
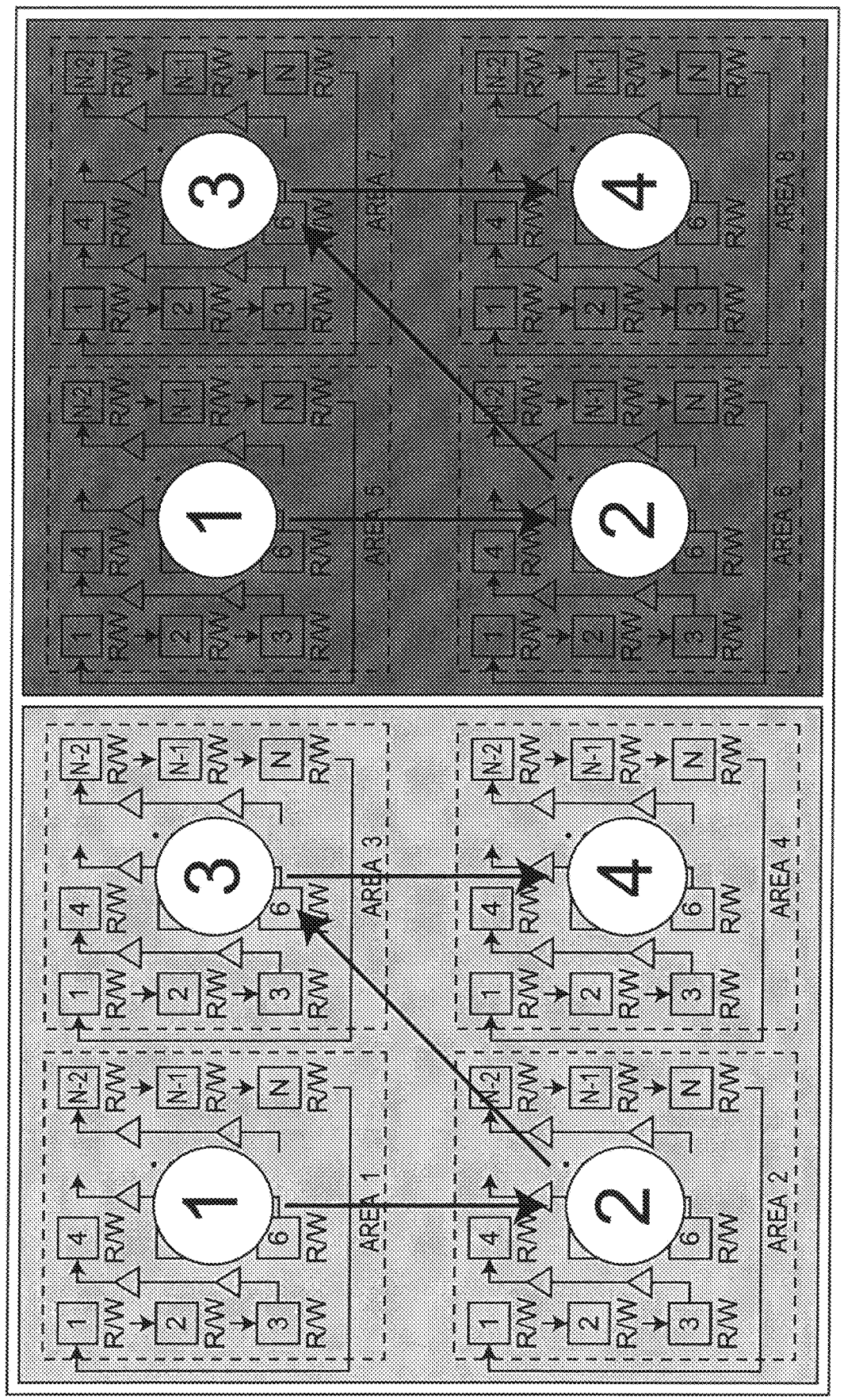
FIG. 14 is an explanatory diagram illustrating a modification example in which a plurality of reader/writers arranged in each area are operated in order by area.
Figure 15:
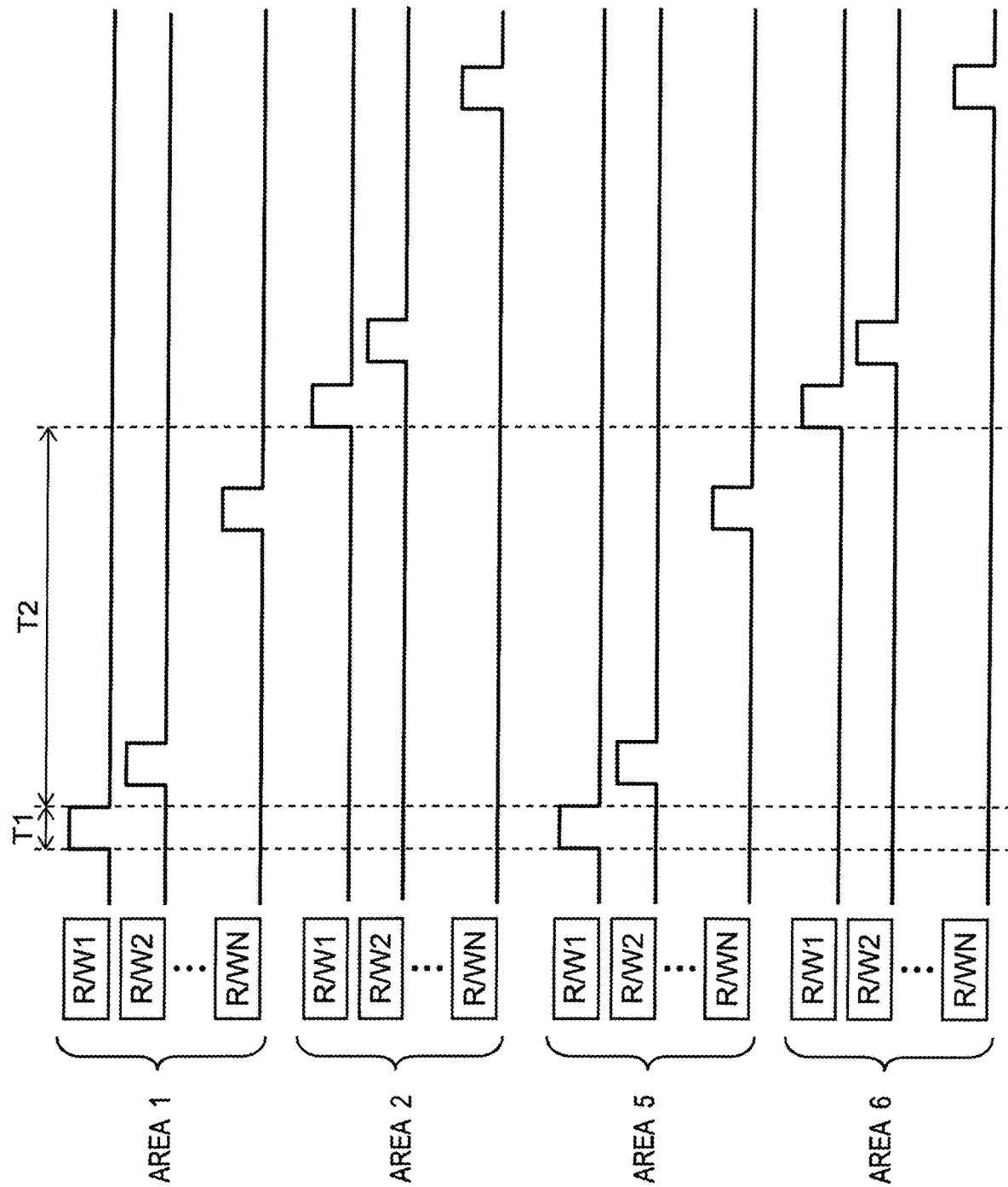
FIG. 15 is a chart illustrating operation timings of each reader/writer according to the modification example of FIG. 14.

In the third and fourth embodiments, the respective reader/writers R/W1 arranged in the areas 1 to M are operated at the same time, but the present disclosure is not limited thereto. For example, the reader/writers R/W1 arranged in mutually adjacent areas may be operated in a time division manner. For example, as illustrated in FIGS. 14 and 15, the respective reader/writers R/W1 arranged in the areas 1 to 4 may be operated in order, and the respective reader/writers R/W1 arranged in the areas 5 to 8 may be operated in order. At this time, the reader/writer R/W1 arranged in the area 1 and the reader/writer R/W1 arranged in the area 5 may be operated at the same time. With this configuration, it is possible to shift the operation timings of the respective reader/writers R/W1 to R/WN arranged in mutually adjacent areas, and it is possible to further suppress interference of radio waves.

It should be noted that the present disclosure includes appropriate combinations of arbitrary embodiments and/or examples of the various embodiments and/or examples described above, and the effect which each embodiment and/or each example has can be exerted.

As described above, the reader device according to the present disclosure is configured to be used as a table, a hanger rack, or the like, which displays an article with an RFID tag, for example, since it provides a wider readable area according to its configuration.

EXPLANATIONS OF LETTERS OR NUMERALS 1, 1A reader device
2 antenna element
3 reader module
4 case
4A container
4B lid
4a main surface
4aa first side
4ab second side
4ac third side
4ad fourth side
10 table with reader device
11 top plate part
12 leg part
13a, 13b, 13c RFID tag
14a, 14b, 14c article
21 first dipole antenna 21A first element axis
21a first radiation conductor
21b second radiation conductor
22 second dipole antenna
22A second element axis
23, 24 coaxial cable
23a outer conductor
23b inner conductor
31 first RFIC element
32 second RFIC element
33 controller
34 RFIC element
35 external communication antenna
36 battery
37 RFIC element
38 switch
41 RFIC element
42 dipole antenna
43 antenna element
50 shelf
51, 52 shelf board
60 shop side terminal
61 shop side antenna
62 RFIC element
63 controller
100, 200, 200A article management system
R/W1 to R/WN reader/writer
CT central terminal

The invention claimed is:

1. A reader device comprising:
an antenna element configured to communicate with an RFID tag attached to an article, the antenna element including:
 a first dipole antenna having a first element axis extending in a first direction; and
 a second dipole antenna having a second element axis extending in a second direction that intersects the first direction;
a reader module electrically connected to the antenna element and configured to read information of the RFID tag via the antenna element; and
a case housing the antenna element and the reader module, with the case having a main surface having a longitudinal dimension and a lateral dimension that are greater than a thickness of the case, with the main surface being rectangular as viewed from a thickness direction of the case,
wherein the first element axis is disposed adjacent to a first side of the main surface of the case and extends along the first side, and the second element axis is disposed adjacent to a second side orthogonal to the first side of the main surface of the case and extends along the second side.

2. The reader device according to claim 1, wherein the reader module comprises:
a first RFIC element configured to supply a high frequency signal to the first dipole antenna;
a second RFIC element configured to supply a high frequency signal to the second dipole antenna; and
a controller configured to switch signal supply operations of the first and second RFIC elements in a time division manner.

3. The reader device according to claim 2, wherein the controller is configured to change a ratio of switching in the time division manner in response to a plurality of RFID tags read through the first and second dipole antennas, respectively.

4. The reader device according to claim 1, wherein the reader module comprises:
an RFIC element configured to supply a high frequency signal;
a switch configured to switch to either of the first and second dipole antennas of which the high frequency signal of the RFIC element is supplied; and
a controller configured to control a high frequency signal supply operation of the RFIC element and a switching operation of the switch.

5. The reader device according to claim 4, wherein the controller is configured to change an interval for switching the switch in response to a plurality of RFID tags read through the first and second dipole antennas.

6. The reader device according to claim 1, wherein at least one of the first and second dipole antennas is a folded dipole antenna.

7. The reader device according to claim 1 wherein the first dipole antenna is unevenly distributed towards a third side of the main surface of the case that opposes the second side, and the second dipole antenna is unevenly distributed towards a fourth side of the main surface of the case that opposes the first side.

8. The reader device according to claim 1, wherein the reader module comprises an external communication antenna.

9. A reader device comprising:
a case housing having a rectangular shape, with the case having a main surface having a longitudinal dimension and a lateral dimension that are greater than a thickness of the case, with the main surface being rectangular as viewed from a thickness direction of the case;
an antenna element housed in the case and having:
 a first dipole antenna with a first element axis extending in a first direction parallel to a first side of the case, and
 a second dipole antenna with a second element axis extending in a second direction parallel to a second side of the case that extends in a direction orthogonal to the first side; and
a reader module electrically connected to the antenna element and configured to read information of an RFID tag via the antenna element,
wherein the first element axis is disposed adjacent to a first side of the main surface of the case and extends along the first side, and the second element axis is disposed adjacent to a second side orthogonal to the first side of the main surface of the case and extends along the second side.

10. The reader device according to claim 9, wherein the reader module comprises:
a first RFIC element configured to supply a high frequency signal to the first dipole antenna;
a second RFIC element configured to supply a high frequency signal to the second dipole antenna; and
a controller configured to switch signal supply operations of the first and second RFIC elements in a time division manner.

11. The reader device according to claim 10, wherein the controller is configured to change a ratio of switching in the time division manner based on a number of RFID tags read through each of the first and second dipole antennas, respectively.

12. The reader device according to claim 11, wherein the reader module comprises:
an RFIC element configured to supply a high frequency signal;

a switch configured to switch to either of the first and second dipole antennas of which the high frequency signal of the RFIC element is supplied; and a controller configured to control a high frequency signal supply operation of the RFIC element and a switching operation of the switch.

13. The reader device according to claim 12, wherein the controller is configured to change an interval for switching the switch based on RFID tags read through each of the first and second dipole antennas, respectively.

14. The reader device according to claim 9, wherein at least one of the first and second dipole antennas is a folded dipole antenna.

15. The reader device according to claim 9, wherein the first element axis is arranged adjacent to the first side of the case and the second element axis is arranged adjacent to the second side of the case.

16. The reader device according to claim 15, wherein the first dipole antenna is unevenly distributed towards a third side of the case that opposes the second side, and the second dipole antenna is unevenly distributed towards a fourth side of the case that opposes the first side.

17. A table with a reader device, the table comprising:
a top plate having a front surface side configured to receive an article to which an RFID tag; and
a reader device attached to a rear surface side of the top plate and configured to read information of the RFID tag, the reader device including:
an antenna element configured to communicate with the RFID tag, the antenna element including:
a first dipole antenna having a first element axis extending in a first direction adjacent a main surface of the top plate; and
a second dipole antenna having a second element axis extending in a second direction adjacent a main surface of the top plate, with the second direction intersecting the first direction; and
a case housing the antenna element and having a main surface having a longitudinal dimension and a lateral dimension that are greater than a thickness of the case, with the main surface being rectangular as viewed from a thickness direction of the case,
wherein the first element axis is disposed adjacent to a first side of the main surface of the case and extends along the first side, and the second element axis is disposed adjacent to a second side orthogonal to the first side of the main surface of the case and extends along the second side.

* * * * *